US005560256A

United States Patent [19]

Tines

[11] Patent Number: 5,560,256

[45] Date of Patent: Oct. 1, 1996

[54] BASE SUPPORT FOR MOVABLE OBJECTS

[76] Inventor: John L. Tines, 1 Lakeside Green Dr., St. Louis, Mo. 63124

[21] Appl. No.: 401,865

[22] Filed: Mar. 10, 1995

Related U.S. Application Data

[63] Continuation-in-part of Ser. No. 376,786, Jan. 23, 1995, which is a continuation-in-part of Ser. No. 180,873, Jan. 11, 1994, Pat. No. 5,473,335.

[51] Int. Cl.$^{6}$ .............................. F16H 29/20; H01Q 3/04

[52] U.S. Cl. ........................ 74/490.10; 74/89.14; 74/398; 74/665 C; 248/284.1; 248/292.12; 472/97; 901/28

[58] Field of Search .............................. 74/490.10, 89.14, 74/398, 665 C; 248/284.1, 292.12; 472/95, 96, 97; 901/23, 25, 28; 343/766

[56] References Cited

U.S. PATENT DOCUMENTS

| | | | |
|---|---|---|---|
| 2,748,617 | 6/1956 | Diebel | 74/398 |
| 5,245,351 | 9/1993 | Chou | 343/766 |

*Primary Examiner*—Charles A. Marmor
*Assistant Examiner*—Troy Grabow
*Attorney, Agent, or Firm*—Polster, Lieder, Woodruff & Lucchesi, L.C.

[57] ABSTRACT

A base support for a moveable object, particularly an amusement ride employing a stepping motor and stepping motor controller to move the object in fine increments. The base support is attached to an upstanding mounting member. An amusement ride is attached to a first support structure connected to a base member. The support structure is operatively connected to a worm gear assembly and motor driven worm gear disposed between the base member and the support structure to effect movement of the amusement ride about a predetermined axis. The worm gear is driven by a stepping motor. The stepping motor is controlled by a stepping motor controller to control incremental movement of the amusement ride. A second worm gear assembly can be interposed transversely between the first support structure and a second support structure to effect movements of the antenna about a horizontal axis. A second stepping motor and second stepping motor controller are used to drive the second worm gear and effect incremental movement of the amusement ride about the horizontal axis.

7 Claims, 10 Drawing Sheets

BASE SUPPORT FOR MOVABLE OBJECTS

This application is a continuation-in-part of application Ser. No. 08/376,786, filed Jan. 23, 1995, which is a continuation-in-part of application Ser. No. 08/180,873, filed Jan. 11, 1994 now U.S. Pat. No. 5,473,335.

BACKGROUND OF THE INVENTION

This invention relates to base support or mounting assemblies for movable antenna, more particularly to stepping motor driven supports for the horizontal and vertical rotation of dish antenna for audio, video or data signals.

It is well known that a satellite antenna may be mounted on a support having relatively movable parts which allow the antenna to be aimed toward a particular satellite in geostationary orbit about the earth to collect signals relayed and/or transmitted from that satellite. A description of the general operation of dish antenna and the relationship thereof to orbiting satellites beaming signals to such antenna is contained in U.S. Pat. No. 4,617,572, issued Oct. 14, 1986, the disclosure of which is incorporated herein by reference thereto.

As described in U.S. Pat. No. 5,281,975, it is known to provide a base support for a dish antenna having manual adjusting means to adjust the position of the antenna along a predetermined plane to direct the antenna toward the "Clark belt" or "geostationary satellite belt". Thereafter, second adjustment means on the base support, including a reversible motor, may be used to scan back and forth along the satellite belt until desired signals from a particular satellite are clearly being received by the dish antenna.

According to U.S. Pat. No. 5,281,975, and as clearly shown in FIGS. 1–5 thereof, the reversible electric motor M drives a worm 62 which is in intermeshing contact of a worm gear 30. The motor M is mounted stationary in the horizontal plane, while revolution of worm 62 will cause worm gear 30 to move in a horizontal plane i.e. about a vertical axis, thereby repositioning the attached dish antenna.

In the aforestated systems, the worm is actuated by a DC motor driven by a power source. To move the assembly incrementally, the DC motor sends back a pulse count to a controller by means of a high to low voltage signal, such as a twelve (12) to 36 (thirty-six) volts being the high voltage end 0 (zero) to 1 (one) being low voltage. This change in voltage is a count pulse and is accomplished, generally, by opening and closing a switch in a fixed power supply source. The switch may be magnetic, mechanical, or solid state.

The controller operates until it receives a predetermined count and then shuts down. The count speed is predetermined by the rotational speed of the unit. The rotational speed of the unit is determined by the voltage and the load on the motor. This type of feedback control does not allow for particularly fine increments of movement. This is a problem on small or miniature antenna assemblies, for example mobile mounted antenna, which require fine positional adjustments relative to the change in position of the antenna-bearing mobile unit.

It will be appreciated that worm gear drives have two forces working in the system. There are axial forces along the axis of the drive worm and radial forces which tend to push the drive worm out of the worm gear. In a worm driven satellite antenna mount, zero backlash is required since the satellites are positioned at two degree (2°) spacing. The movement of the antenna due to backlash between the worm and worm gear would cause a loss of signal strength which weakens the reception or can cause a complete loss of reception. For example, on a 30 tooth worm gear each tooth represents twelve degrees (12°) of rotation. At a pitch diameter of 1.25 inches, one tooth is the circumference divided by 30 or 3.927 inches divided by 30 or 1.309 inches. One degree of rotation of the antenna is 0.1309 divided by 12 or 0.0109 inches. A 10% error of movement ins 0.0011 inches of movement on the circumference or 1% of a tooth. Such movement occurs when the worm drive moves away from the worm gear or by the worm drive moving axially.

While the original intended use of the present invention was to provide controlled horizontal and vertical movement of an antenna, I have discovered that the device has application in the movement of other objects in two planes. For example, a platform or other structure can be attached to the mounting system of the present invention and moved in a horizontal plane, vertical plane or both planes at the same time. The unique function of the present invention has particular application in the amusement industry. For example, a platform can be attached to the mounting system. A user can stand on the platform and control the activation of the motor driven worm gears to effect vertical as well as horizontal movement of the platform. This application would have utility in "virtual reality" amusement games or rides. Furthermore, smaller, coin operated amusement rides, such as cars or rocket ships can employ the mounting system to allow movement of the ride in two different planes to enhance the appeal of the ride.

SUMMARY OF THE INVENTION

It is, therefore a principal object of the present invention to provide an antenna mount having a motor drive and driver system for the rotation of an antenna mount which can move the antenna in small increments to provide fine horizontal rotational movements 360° about a predetermined axis.

It is another object of the present invention to provide an antenna mount having a second motor and control system that provide fine incremental movements of an antenna about a horizontal axis for fine vertical adjustment of the attached antenna.

Another object of the present invention is to provide a unit that does not require a feedback signal to a controller.

Yet another object of the present invention is to provide a unit that does not require electrical switches in its motor drive system to protect the antenna from mechanical damage.

Still another object of the present invention is to provide an antenna mount employing a stepping motor and stepping motor driver to provide fine incremental movement of the antenna about a predetermined axis.

A further object of the invention is to provide an antenna mount wherein the speed of horizontal and vertical movement of the antenna is determined by a preset rate of pulses sent from the respective stepping motor driver to the respective stepping motors.

It is another object of the present invention to provide a unit that does not have any backlash between the worm and worm gear.

Another object of the invention is to provide a mounting system that can move a large object in two different planes at the same time.

Still another object of the invention is to provide such a mounting system that can be employed in an amusement ride to move the ride in more than one plane at the same time.

In accordance with the invention, generally stated, a base support for the supporting, positioning, and mounting of an antenna such as a satellite dish antenna, on a stationary upstanding member is provided having a worm gear assembly mounted to the stationary member. The worm gear assembly has a tubular outer main bearing having a worm gear at its first end and diametrically opposed support legs for mounting on the stationary member at its second end. A base member is rotatably attached to the worm gear assembly. An inner main bearing is mounted between the worm gear and the base member with one bearing surface resting on the worm gear and a second bearing surface abutting the base member. An antenna support structure is integrally formed on the base member. A motor driven worm assembly is attached to base member having a rotatable worm in tight intermeshing contact with the worm gear. A stepping motor, driven by a stepping motor driver drives the worm. The stepping motor driver is controlled by an externally supplied power source and control which can be a simple battery and switch or a complex microprocessor. The motor, the worm assembly, the base member and the associated antenna support are all movable in a generally horizontal plane about the vertical axis worm gear assembly upon operation of the stepping motor. In an alternative embodiment, a second worm gear assembly and a second driven motor driven worm assembly are mounted transverse to the first such assemblies, between those assemblies and the antenna support structure, so as to move the associated antenna in a generally vertical plane about the horizontal axis of second worm gear assembly upon operation of the second stepping motor. In another embodiment backlash between the worm and worm gear is eliminated by locking the ball bearing in the output of the gear shaft on which the worm is mounted.

In another alternative embodiment, the support employs a first and second worm gear as well as the associated first and second motor driven worm gears. The support is mounted to a stationary member. The first and second motor driven worm and worm gear assemblies are positioned between the stationary member and an amusement ride. The rider can control both the first and second motor driven worms so as to produce movement of the ride in two different planes so as to enhance the stimulatory effects of the ride.

DETAILED DESCRIPTION OF THE PREFERRED EMBODIMENT

Figure 1:
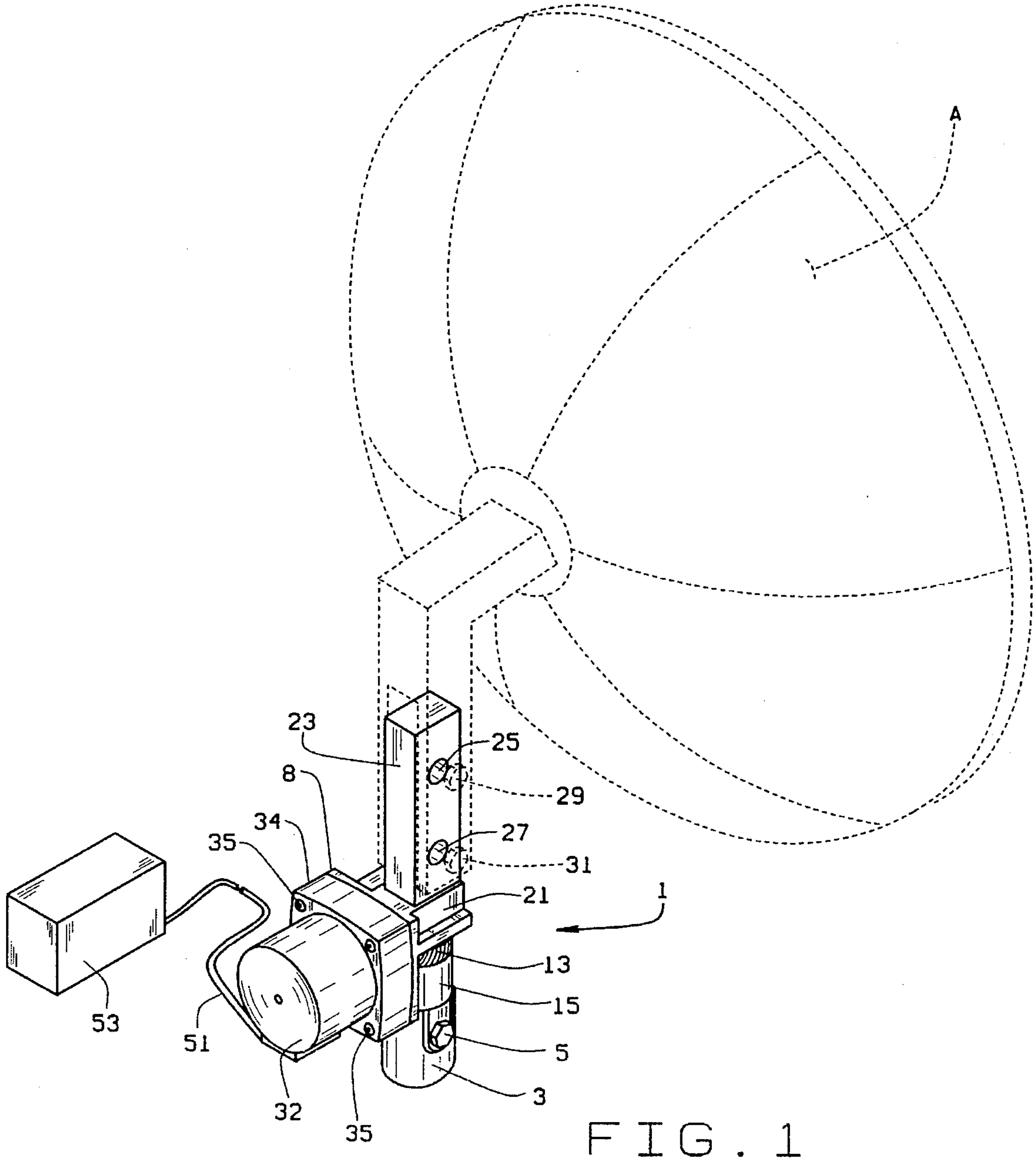
FIG. 1 is a perspective view of the antenna base support of the present invention having an antenna, shown in phantom, mounted thereon.

With reference to the drawings, and, FIG. 1 in particular, there is shown a base support for a dish antenna, or the like, generally referred to by reference numeral 1, constructed in accordance with the principles of the present invention. Support 1 is shown supporting a dish antenna A. The elements of base support 1 will be described in greater detail hereinafter.

Base support 1 is generally attached to an stationary upright member or extension 3. It should be noted that upright 3 can be formed of in any appropriate configuration or of any appropriate material, such as tubular steel, and in any appropriate design. Furthermore, extension 3 may be an extension of or is connected to an appropriate platform, brace, bracket, or the like, to facilitate the mounting of the antenna base support of the present invention on a surface, such as on the roof of a vehicle, in the case of a mobile antenna. The mounting means and the stationary upright do not form part of the invention, as claimed.

Support 1 is secured to upright 3 by means of a nut and bolt assembly 5 or other appropriate means. The elements of support 1 may be protected from the weather, dirt, and debris by an appropriate shroud or plastic cover (not shown) which surrounds the working elements of support 1.

Figure 2:
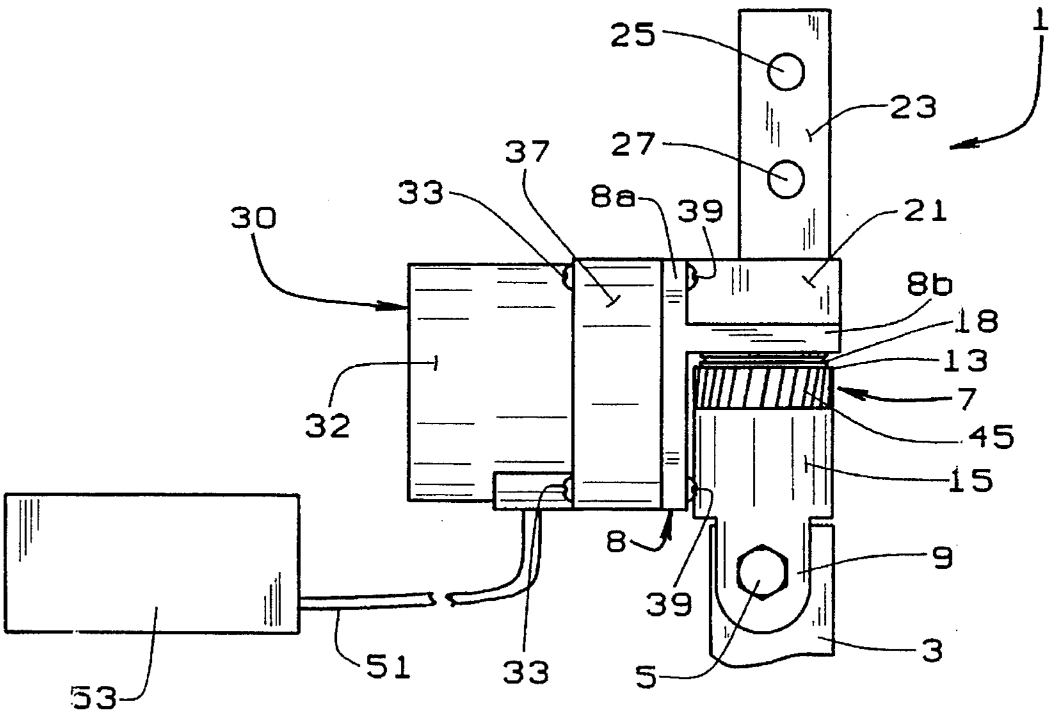
FIG. 2 is a front elevational view of the antenna base support of the present invention.
Figure 3:
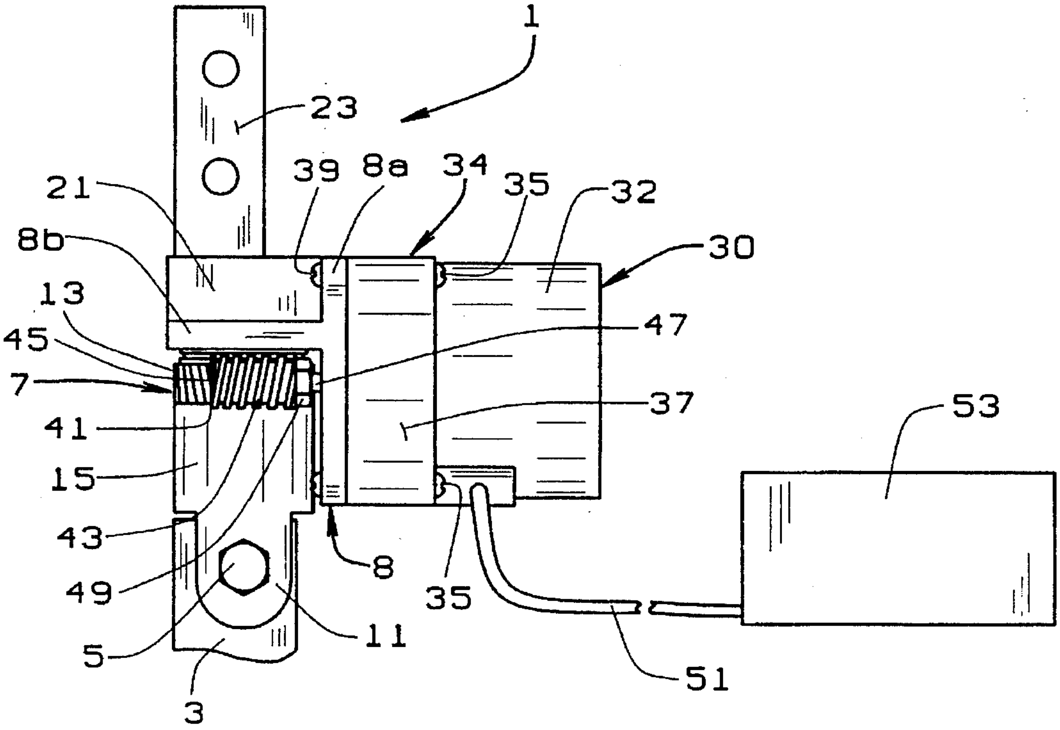
FIG. 3 is a rear elevational view of the antenna base support of the present invention.

Support 1 is shown in greater detail in FIGS. 2 and 3. Adjacent upright support 3 is a worm gear assembly 7. Worm gear assembly 7, includes a generally horizontally disposed worm gear, 13. Outer main bearing 15 has an axial bore formed therethrough for the insertion of a shaft (not shown) to attach the worm gear assembly to a base member 8. Base member 8 has a generally "T" configuration and is formed from a vertically positioned web *8a* and a horizontally positioned web *8b*. As previously described, support legs 9 and 11 are integrally formed and extend from the lower end of main bearing 15. Gear 13 is integrally formed from the opposite end of bearing 15. Worm gear assembly 7 can be constructed from a resilient material, such as nylon, or it can be formed from metal or other appropriate material.

An annular inner main bearing 18 is positioned between worm gear 13 and the bottom surface of web *8b*, with one bearing surface of inner bearing 18 abutting worm gear 13 and the opposite bearing surface abutting web *8b*. A boss 21 is integrally formed on the top surface of web *8b* diametrically opposed to inner bearing 18. Antenna support 23 is integrally formed on and extends from boss 21. Antenna support 23 has holes 25 and 27 formed therethrough for the attachment of antenna A with bolts 29 and 31 are with other appropriate attachment means. It should be noted that base 8, including webs 8a and 8b, boss 21 and antenna support 23 may be formed as one piece from cast metal or other appropriate material. Alternatively, the various elements just described can be separate elements suitably attached together as if formed in one piece.

A motor driven worm assembly, shown generally as 30, is attached to a side of web 8a opposite worm gear assembly 7. Worm assembly 30 has a stepping motor 32 operatively associated with and mounted to a gear transmission assembly 34 with mounting screws 35. A conventional gear train (not shown) is contained within a gear case 37 and is available in various stepping motor gear reduction ratios depending upon the application. Case 37 is attached to web 8a with screws 39 or other appropriate attachment means.

A generally cylindrically worm 41, having a continuous helical tooth 43, is in intermeshing contact with adjacent ones of the radially outwardly directed teeth 45 which are positioned 360° circumferentially around worm gear 13. Worm 41 is mounted for rotation about its horizontal axis on a shaft 47 which operatively connected to, and protrudes from, gear assembly 34 through web 8a. Worm 41 which is secured in place by a hex nut 49 or other appropriate means. Worm 41 may be driven in either direction of rotation by a reversible stepping motor 32 through transmission 34.

Motor 32 is connected by electrically conductive wire 51 to a stepping motor driver 53. It should be noted that wire 51 is shown connected directly to motor 32 and exposed for illustrative purposes only. Wire 51 may be suitably connected to motor 32 in any conventional or accepted manner that would allow assembly 1 to rotate about a vertical axis without tangling or binding wire 51. For example, wire 51 may be housed with an upright 3 and connected with a conventional slip ring electrical connector or any other suitable arrangement. Moreover, the antenna A lead wire (not shown) should be suitably placed and arranged so as to avoid problems of winding or tangling.

In operation, base support 1 is used to scan in a generally horizontal plane around the vertical axis of worm gear 13. The stepping motor driver 53 is activated to operate motor 32. Motor 32 drives gear transmission 34 which is operatively attached to shaft 47 of worm 13 to rotate helical tooth 45 about the horizontal axis of shaft 47 in a desired rotational direction. Inasmuch as worm gear 13 and outer main bearing 15 are held in place by legs 9 and 11, rotation of worm tooth 45 will cause worm 41 to revolve, along with base 8 and worm assembly 30, and antenna support 23. Web 8b will rotate on a bearing surface of inner bearing 18 which is free to rotate on the surface of worm gear 13. The surfaces between worm gear 13 and inner bearing 18, as well as between web 8b and inner bearing 18, are sufficiently smooth and lubricated to provide smooth movement of the base 8, as well as the parts mounted thereon, relative to worm gear 13, about the vertical axes of inner and outer bearing members. When motor 32 is stopped, worm 41 will not rotate, thus providing a locked positioning of antenna support 23 and, thus, antenna A.

Since it is advantageous to change the horizontal positioning of antenna A in fine increments, corresponding to the location of particular satellite or signals, support 1 employees a stepping motor 32 and driver 53. Driver 53 actuates motor 32 by sending voltage pulses to motor 32. Motor 32 will move in any fixed amount of rotational degrees, by driving worm 41, depending upon the design of motor 32. For example, the motor may be designed to drive worm 41 so that the worm assembly 30, base 8, and thus antenna A move 1° per pulse, 7½° per pulse, or 15° per pulse at the motor shaft through the reduction ratio depending upon the application. A 600:1 reduction ratio provides 0.012° movement at the antenna for a 7½° design motor. Moreover, the speed of rotation is dependent upon the rate that pulses are sent from driver 53 to motor 32. For example, at one degree per pulse, motor 32 requires 360 pulses to rotate one complete rotation about worm gear 13. Therefore, motor 32, as well as base 8 and the various attached elements, can move in very fine increments of one degree or one pulse at a time. The rate of rotation can be increased or decreased by increasing or decreasing the rate of pulses sent from the driver to the motor.

Figure 4:
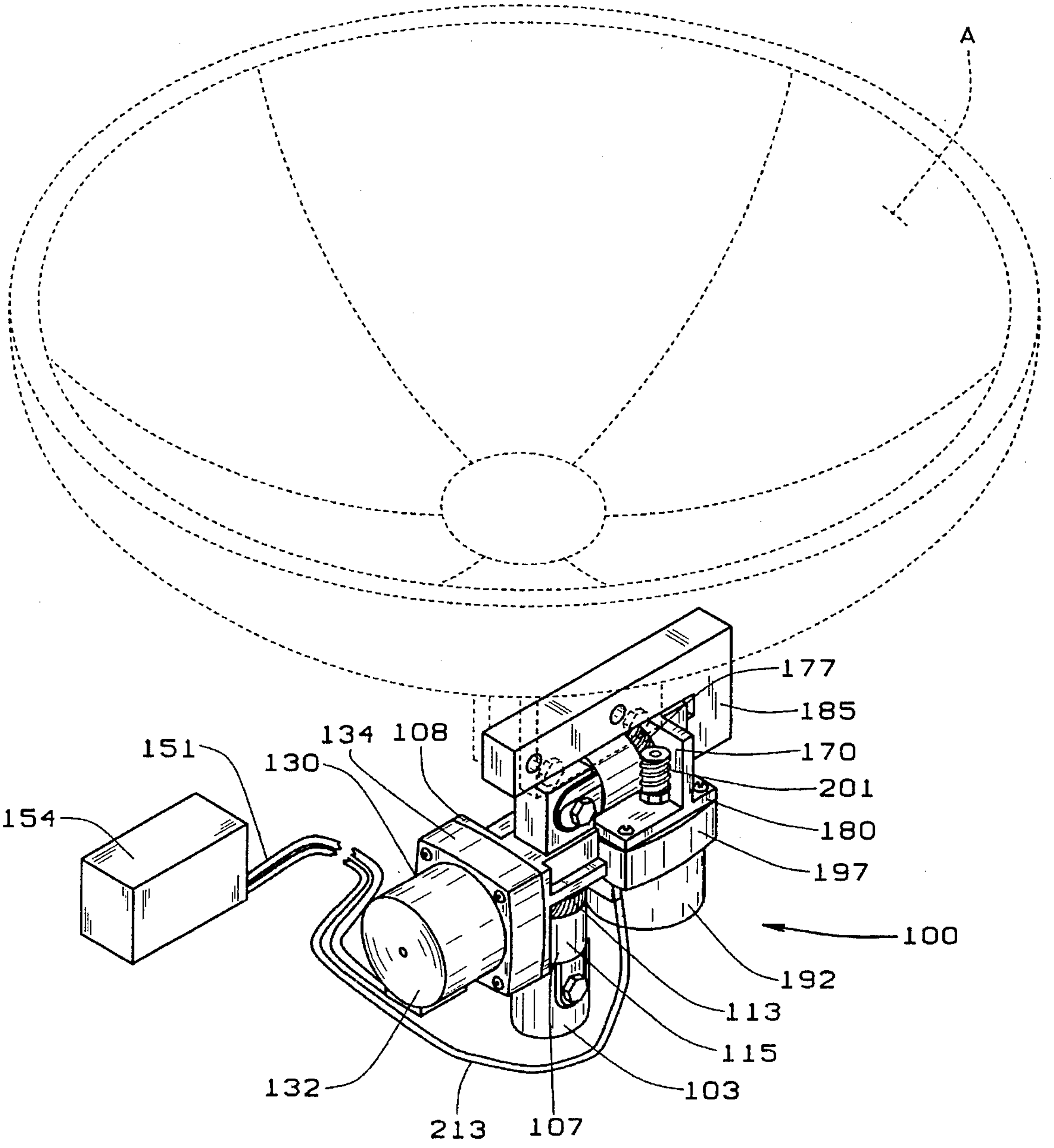
FIG. 4 is a perspective view of an alternative embodiment of the antenna base support of the present invention having an antenna, shown in phantom, mounted thereon.
Figure 5:
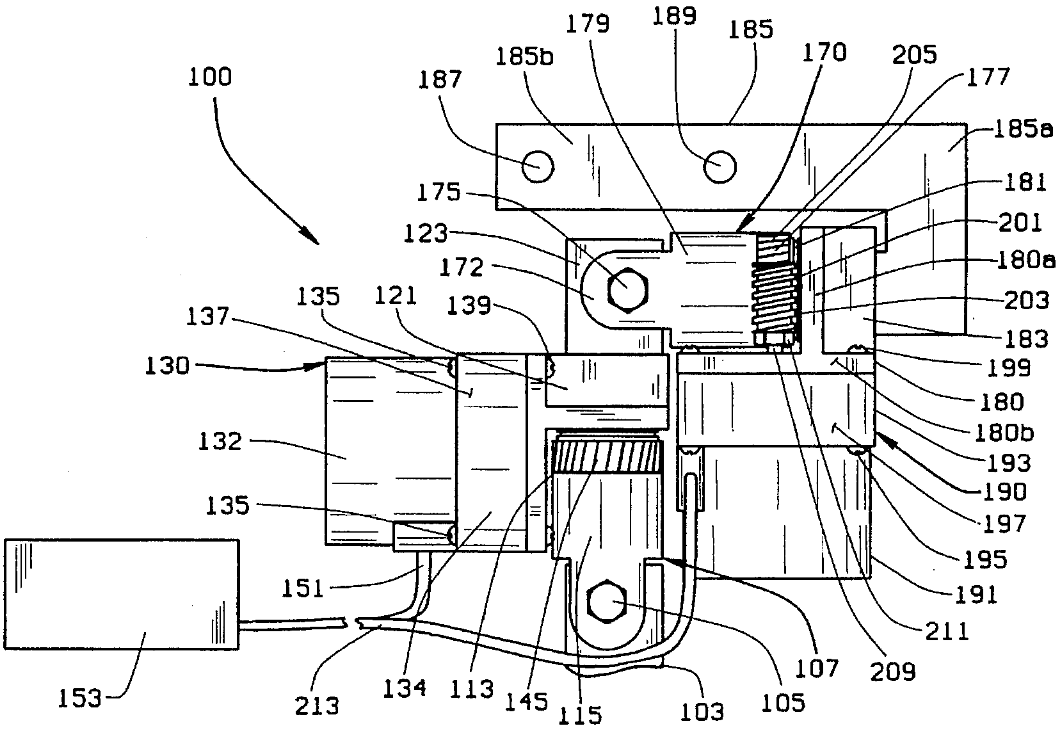
FIG. 5 is a front elevational view of the antenna base support as illustrated in FIG. 4.
Figure 6:
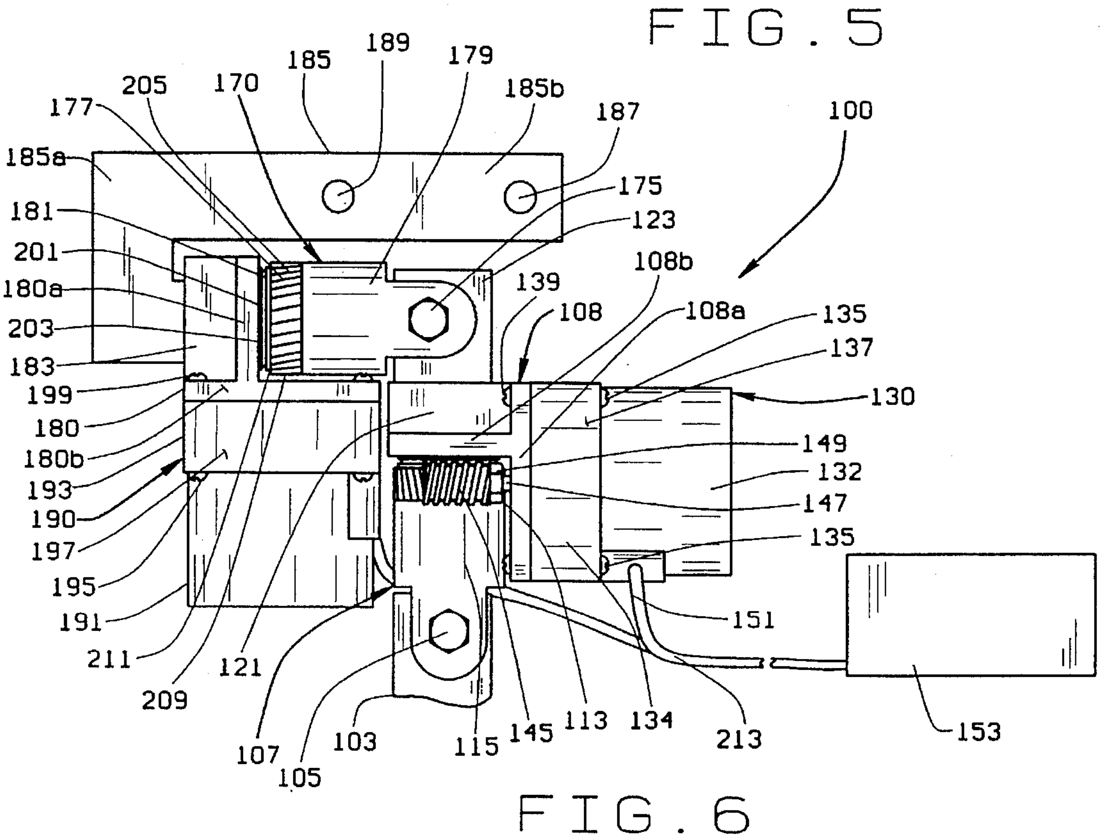
FIG. 6 is a rear elevational view of the antenna base support as shown in FIG. 4.

FIGS. 4–6 illustrate another preferred embodiment of the base support of the present invention, indicated generally by numeral 100. Support 100 is generally attached to a stationary upright 103. Upright 103 may of any appropriate configuration, as previously explained, and of any appropriate materials such as tubular steel, and is connected to, or an integral part of, a platform, brace or bracket (not shown) used to mount the antenna on a surface, such as the roof of a vehicle. Support 100 is secured to the upright 103 by means of a nut and bolt assembly 105 or other appropriate means. Support 100 may be protected from the weather, dirt or debris by an appropriate shroud or molded plastic cover, (not shown). Adjacent support 103 is a first worm gear assembly 107 having diametrically opposed support legs 109 and 111 which are attached to upright 103 by nut and bolt assembly 105 as previously described. Worm gear assembly 107 also includes a generally horizontally disposed worm gear 113 and an upstanding, tubular outer main bearing 115. Main bearing 115 has an axial bore, (not shown) formed therein. A shaft (not shown) extends through the axial bore of bearing 115 to attach worm gear assembly 107 to a first base member 108. Base member 108 has a generally "T" configuration formed from a vertical web 108a and horizontal web 108b. An annular inner main bearing 118 is positioned between the top surface of worm gear 113 and the bottom surface of web 108b, with one bearing surface abutting worm gear 113 and the opposite bearing surface of abutting web 108b.

A boss 121 is integrally formed on the top surface of web 108b on a side opposite inner bearing 118. A second worm gear assembly support 123 is integrally formed on and extends from boss 121 for the attachment of a second worm gear assembly as will be described in detail below. It should be noted that base 108, including webs 108a and 108b, boss 121, and second worm gear assembly support 123 may be formed as one piece from cast metal or other appropriate material or may be assembled from the various independent elements and appropriately joined together.

A first motor driven worm assembly, shown generally at 130, is attached to a side of web 108a, opposite worm gear assembly 107. Worm assembly 130 has a stepping motor 132 operatively associated with and mounted to a gear transmission assembly 134 with mounting screws 135. A conventional gear train (not shown) is contained within a gear case 137, and is commercially available in appropriate gear ratios. Case 137 is attached to web 108a with screws 139 or other appropriate attachment means.

A first cylindrical worm 141, having a continuous helical tooth 143, is in intermeshing contact with adjacent ones of the radially outwardly directed teeth 145 which are positioned 360° circumferentially around worm gear 113. Worm 141 is mounted for rotation about a horizontal axis on shaft 147, which is operatively associated with, and protrudes from, gear assembly 131 through web 108*a*. Worm 141 and is secured in place by hex nut 149. Worm 141 may be driven in either direction of rotation by reversible stepping motor 132, through gear transmission 134. Motor 132 is connected by electrically conductive wire 151 to a stepping motor driver 153. As stated above, with reference to assembly 1, wire 151 is shown connected directly to motor 32 and exposed for illustrative purposes only. Wire 151 may be suitably connected to the motor and, may be maintained within upright 3 so as to avoid exposure and entanglement about the assembly 100 when in use.

Adjacent second worm gear support 123 is a second worm gear assembly 170, having diametrically opposed support legs 172 and 173 which are mounted to second worm gear support 123 with a nut and bolt assembly 175. Second worm gear assembly 170 includes a vertically disposed worm gear 177 and a horizontally disposed tubular outer main bearing 179. Main bearing 179 has an axial bore (not shown) formed therethrough. A shaft (not shown) extends through the axial bore in bearing 179 so as to connect worm gear assembly 170 to a second base member 180. Second base member 180 has a generally "T" configuration formed from a vertical web 180*a* and a horizontal web 180*b*. An annular inner main bearing 181 is positioned between the outer surface of worm gear 177 and the inner surface of web 180*a*, with one bearing surface abutting worm gear 177 and the opposite bearing surface abutting web 108*a*.

A boss 183 is formed on the outer surface of web 108*a*, opposite inner bearing 181. An antenna support arm 185 is integrally formed on and extends from a boss 183 for the attachment of antenna A. Support arm 185 has a generally vertical section 185*a* and a horizontal section 185*b* integrally connected to the vertical section. Mounting holes 187 and 189 are formed through horizontal section 185*b* for the attachment of an antenna in any appropriate manner. It should be noted that base 180, including webs 180*a* and 180*b*, boss 183 and support arm 185 may be formed from one piece of cast metal or other appropriate material or may be assembled from the various independent element previous described and appropriately joined together.

A second motor driven worm assembly, shown generally at 190, is attached to a bottom side of 180*b*, opposite worm gear assembly 170. Worm assembly 190 has a stepping motor 191 operatively associated with and mounted to a gear transmission assembly 193 with mounting screws 195. A conventional gear train (not shown) is contained within housing 197 and is of the type commercially available in appropriate gear ratios as previously described with reference to assembly 1. Housing 197 is attached to web 108*b* with screws 199 or on the appropriate attachment means. A second cylindrical worm 201 having a continuous helical tooth 203 is in intermeshing contact with adjacent ones of outwardly directed teeth 205 which are positioned 360° circumferentially about worm gear 177.

Worm 201 is mounted for rotation about its horizontal axis on shaft 209 and is secured in place by hex nut 211. Shaft 209 extends through web 180*b* and is operatively associated with the gear train (not shown) within gear transmission 193. Worm 201 is thus driven in either direction by stepping motor 191 which is connected by an electrically conductive wire 213 to a stepping motor driver 153 or a separate stepping motor driver (not shown). It should be noted, that electrical wire 213 is shown, for illustrative purposes, connected directly between stepping motor 191 and stepping motor driver 153. However, as previously explained, the wire may be suitably connected and housed within tubular upright 103 or otherwise appropriately maintained to avoid entanglement with the elements of the support.

In operation, base support 100 is used to scan in both a generally horizontal plane and a generally vertical plane. The antenna A will scan in a generally horizontal plane around the vertical axis of worm gear 113 and in a generally vertical plane around the horizontal axis of worm gear 177. For scanning in a generally horizontal plane, stepping motor driver 153 is activated to operate motor 132. Motor 132 drives gear transmission 134 which is operatively attached to shaft 147 of worm 113 to rotate helical tooth 145 about the horizontal axis of shaft 147 in a desired rotational direction. Inasmuch as worm gear 113 and outer main bearing 115 are held in place by legs 109 and 111, rotation of worm tooth 145 will cause the worm assembly to revolve, along with base 108 and worm assembly 130, antenna support 120 and second worm gear assembly support 123, about worm gear 113. Web 108*b* will rotate on bearing surface of inner bearing 118, which is free to rotate on the surface of worm gear 113. The surfaces between worm gear and inner bearing 118, as well as web 108*b* and inner bearing 118, are sufficiently smooth and lubricated to provide smooth movement of base 108 as well as the parts mounted thereon, relative to worm gear 113 about the vertical axis of the worm gear assembly 107. When the motor is stopped, worm 141 will not rotate, thus providing a locked positioning of the antenna in a desired horizontal position.

Since it is advantageous to change the horizontal positioning of the antenna A in fine increments, corresponding to the location of a particular satellite signals, base support 100 employs a stepping motor 132 and driver 153. Stepping motor 131 will move in fixed amounts of rotational degrees depending upon the design of motor 132 and the pulses sent to motor 131 by stepping motor driver 153 as previously described relative to base assembly 1.

To scan in a generally vertical plane about the axis of worm gear 177, stepping motor driver 153 is operated to activate motor 191. Motor 191 drives gear transmission 193 which is operatively attached to shaft 209 of worm 201 to rotate helical tooth 203 about the vertical axis of shaft 209 in a desired rotational direction. Since worm gear 177 and outer main bearing 179 are held in place by legs 172 and 173, the rotation of worm tooth 203 will cause worm 201 to rotate, along with base 180, worm assembly 190, and antenna support arm 185 with its associated antenna. Web 180*b* will rotate on the bearing surface of inner bearing 181, which is free to rotate on the surface of worm gear 177. The surfaces between worm gear 177 and inner bearing 181, as well as between web 180*a* and inner bearing 181 are sufficiently smooth and lubricated to provide smooth movement of the base, as well as the parts thereon, relative to worm 177, about the horizontal axis of the worm gear assembly 170. When motor 191 is stopped, worm 201 will not rotate, thereby providing a locked positioning of the antenna support 185 and the antenna in the desired vertical position. Stepping motor 191 and the stepping motor driver 153, operate in the same manner as the previously described stepping motors and stepping motor controllers to move antenna A in a vertical plane in fine incremental movements. The rate of movement is dependent upon the pulses sent by driver 153 to stepping motor 191.

Figure 7:
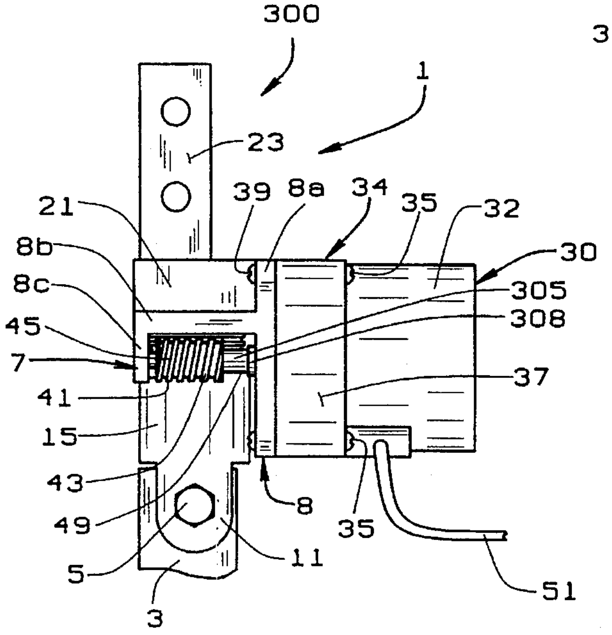
FIG. 7 is a from elevational view of another embodiment of an antenna base support of the present invention.
Figure 8:
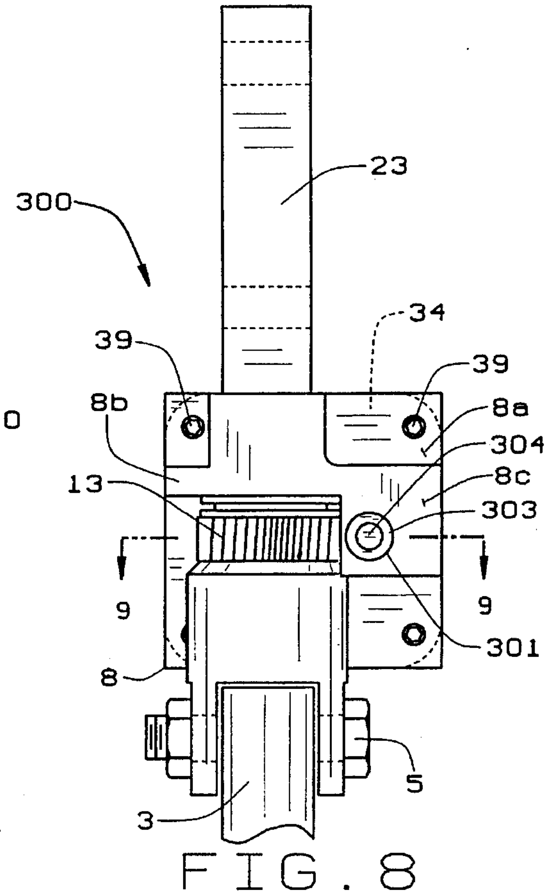
FIG. 8 is a side elevational view of the antenna base support of FIG. 7.
Figure 9:
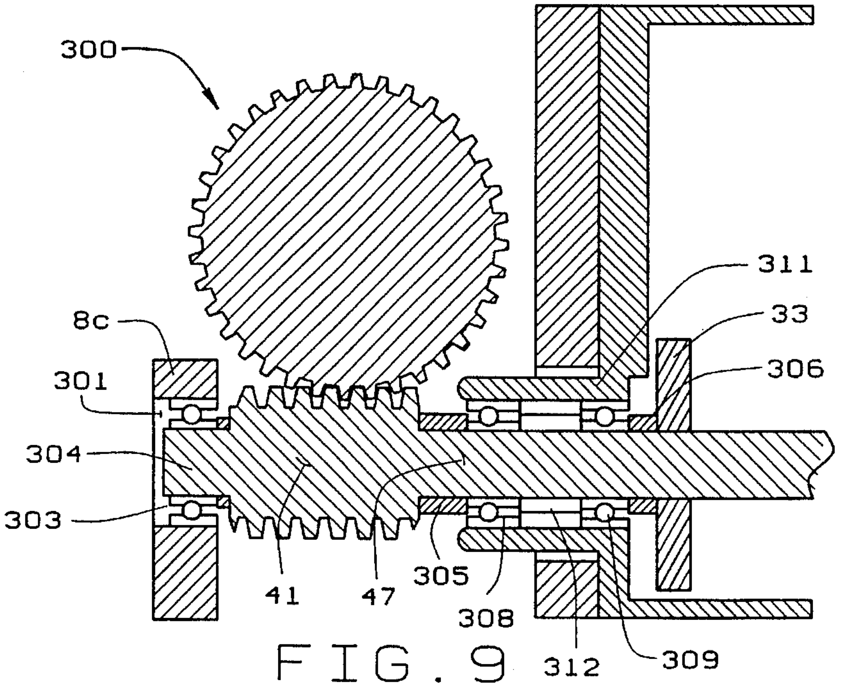
FIG. 9 is a cross-sectional view of the antenna base support taken along 9—9 of FIG. 8.

FIGS. 7–9 illustrate another embodiment of the antenna support of the present invention. The antenna support of FIGS. 7–9, indicated generally by reference numeral 300, is identical to the support as shown and described in FIGS. 1–3 with notable exceptions. There is a worm support web 8c integrally formed on horizontally positioned web 8b. Support web 8c is generally square and perpendicular to web 8b. There is a circular opening 301 formed in support web 8c. A first or outboard ball bearing race 303 is press fitted into opening 301. As stated above, worm 41 is mounted on shaft 47. An end 304 of the shaft 47 seats snugly in bearing 303 so that there is no lateral movement of worm 304 away from worm gear 13. As best seen in FIG. 9, there is a first spacer 305 and second spacer 306 slip fit on shaft 47. First spacer 305 is positioned approximately at a midpoint of shaft 47, adjacent worm 41. The second spacer 306 is at an end of shaft 47 adjacent the drive gear 33. There is a second ball bearing race 308 and third ball bearing race 309 press fired in gear housing 311 with the second race 308 pressed firmly against shoulder 312 of the housing 311. Spacer 305 presets the distance between worm 41 and second ball bearing race 308. During assembly, spacer 306 is slip fit over shaft 306. The second ball bearing race 308 and third ball bearing race 309 are press fitted into the gear housing 311. The shaft 47, with spacer 306 thereon, is slipped through the second and third ball bearing races. With the gear side held firm, spacer 305 is press fitted on shaft 47. Shaft 47 is positioned so that spacer 305 is snug against the second ball bearing race 308 so that there is no axial free play along shaft 47. The worm 41 is now placed on shaft 47 and abuts spacer 305 and held there supporting spacer 305 so axial movement, for practical purposes, does not occur. Housing 311 will now support the worm drive. First ball bearing race 303 is now placed on end 304 of shaft 47. Outboard bearing race 303 is press fitted into the support web 8c. The gear case 37 is attached with screws 39 (FIG. 8). Motor 32 is now positioned to move the worm 41 into proper alignment with the worm gear 13.

Figure 10:
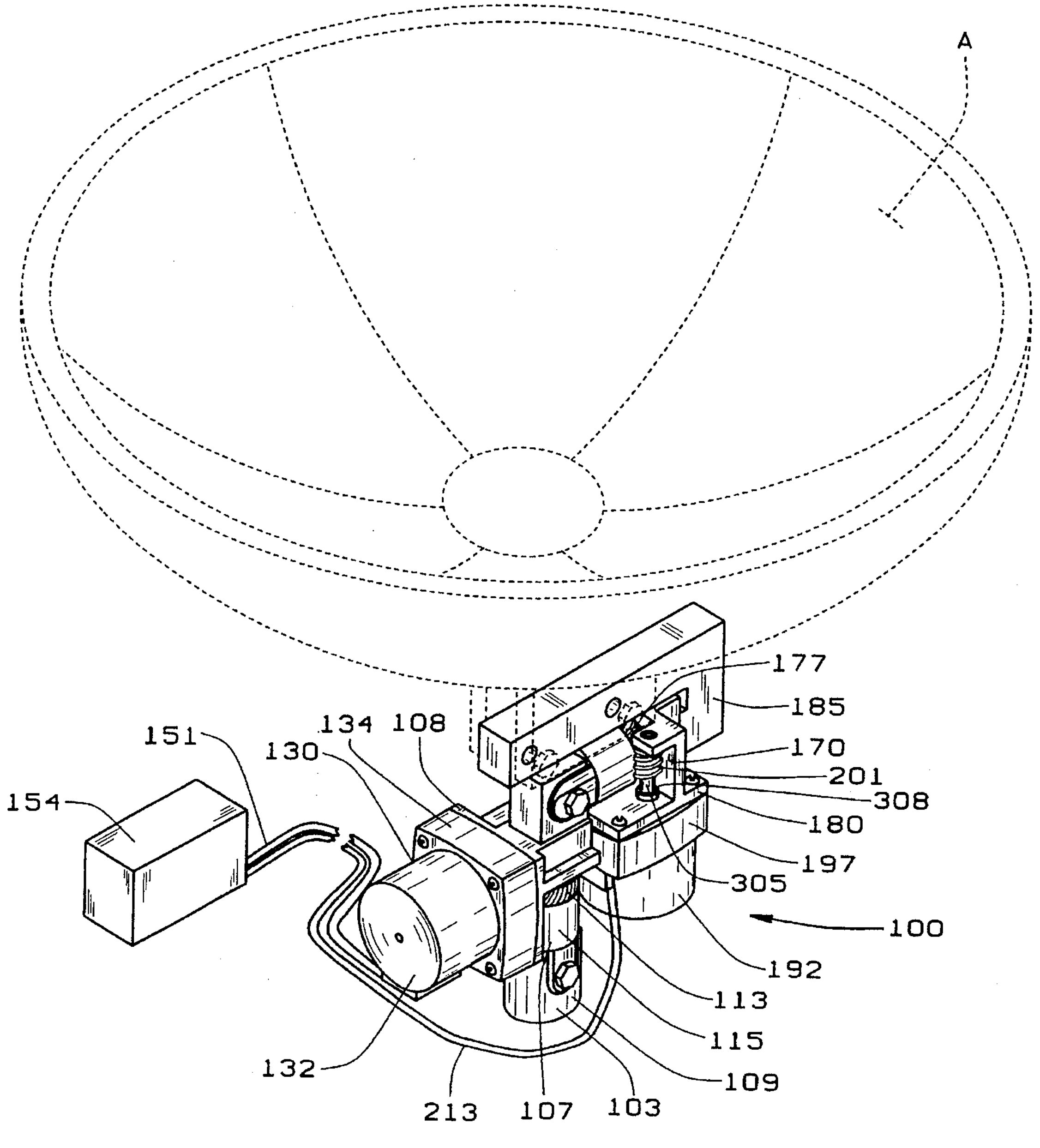
FIG. 10 is a perspective of another alternative embodiment of the antenna base support of the present invention having an antenna, shown in phantom, mounted thereon.
Figure 11:
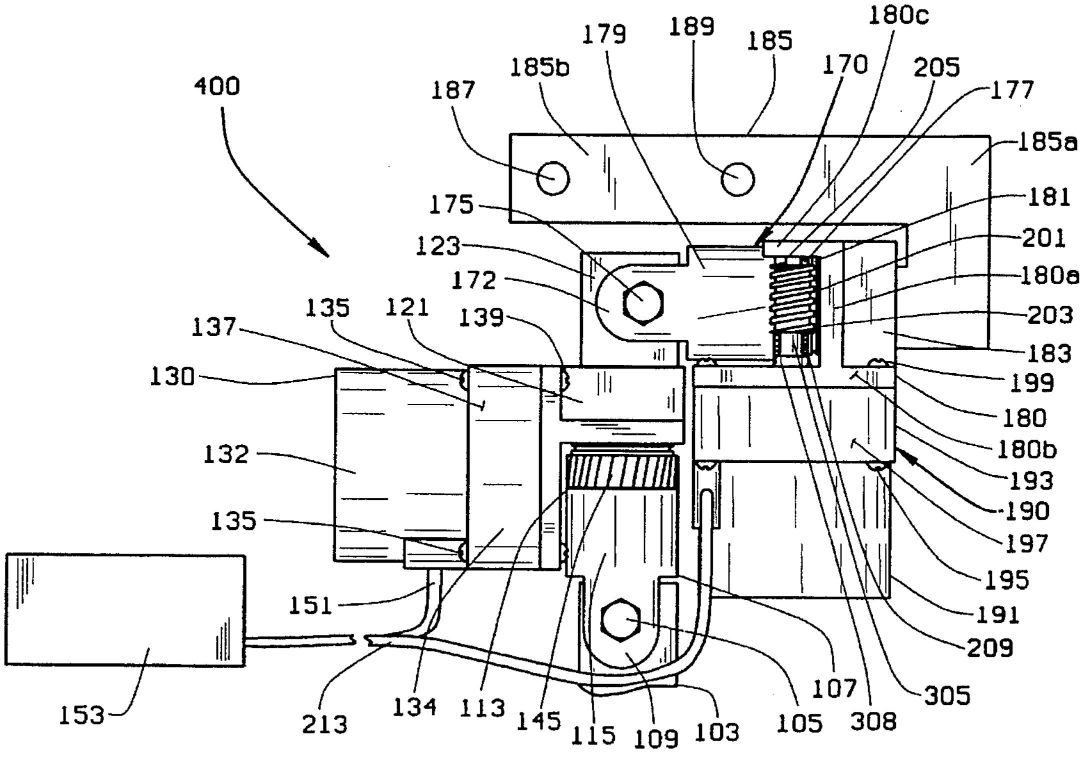
FIG. 11 is a front elevational view of the antenna base support as illustrated in FIG. 10.
Figure 12:
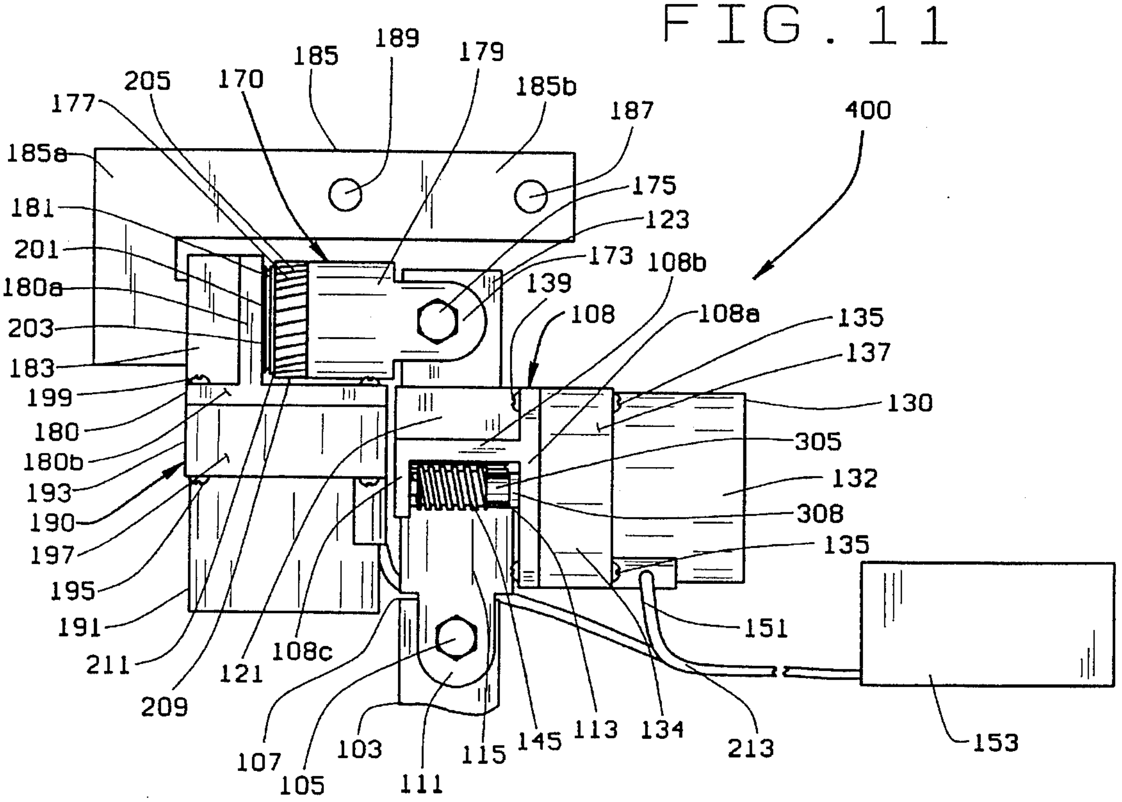
FIG. 12 is a rear elevational view of the antenna base support as shown in FIG. 10.

FIGS. 10–12 illustrate yet another embodiment of the antenna base support of the present invention. The support, indicated generally be reference numeral 400, is identical in structure to support 100 shown in FIGS. 4–6 with some notable exceptions. Support 400 has a first worm support web 108c perpendicular to web 108b. Furthermore, support 400 has a second worm support web 180c perpendicular to horizontal web 180b. The support webs 108b and 180b are assembled and function the same as support web 8c previously described in reference to support 300 in FIGS. 7–9. First cylindrical worm 141 is supported by a first or outboard ball bearing race 303 and second cylindrical worm 201 is supported by a first or outboard ball bearing race 303. The respective outboard ball bearing races are assembled and function the same as outboard ball bearing race 303 previously described relative to support 300, as illustrated in FIG. 9 Furthermore, a cross-section of the first motor driven worm assembly 130 and a cross-section of the second motor driven worm assembly 190 is identical to the cross-section shown in FIG. 7. Each of the respective motor driven worm assemblies employ the spacers 305 and 306, as well as the second and third ball bearing races 308 and 309 previously described with reference to support 300. The unique arrangement of the worm support webs, outboard ball bearing races, second and third bearing races prevent both axial and radial movement of the respective cylindrical worms relative to the respective worm gears.

Figure 13:
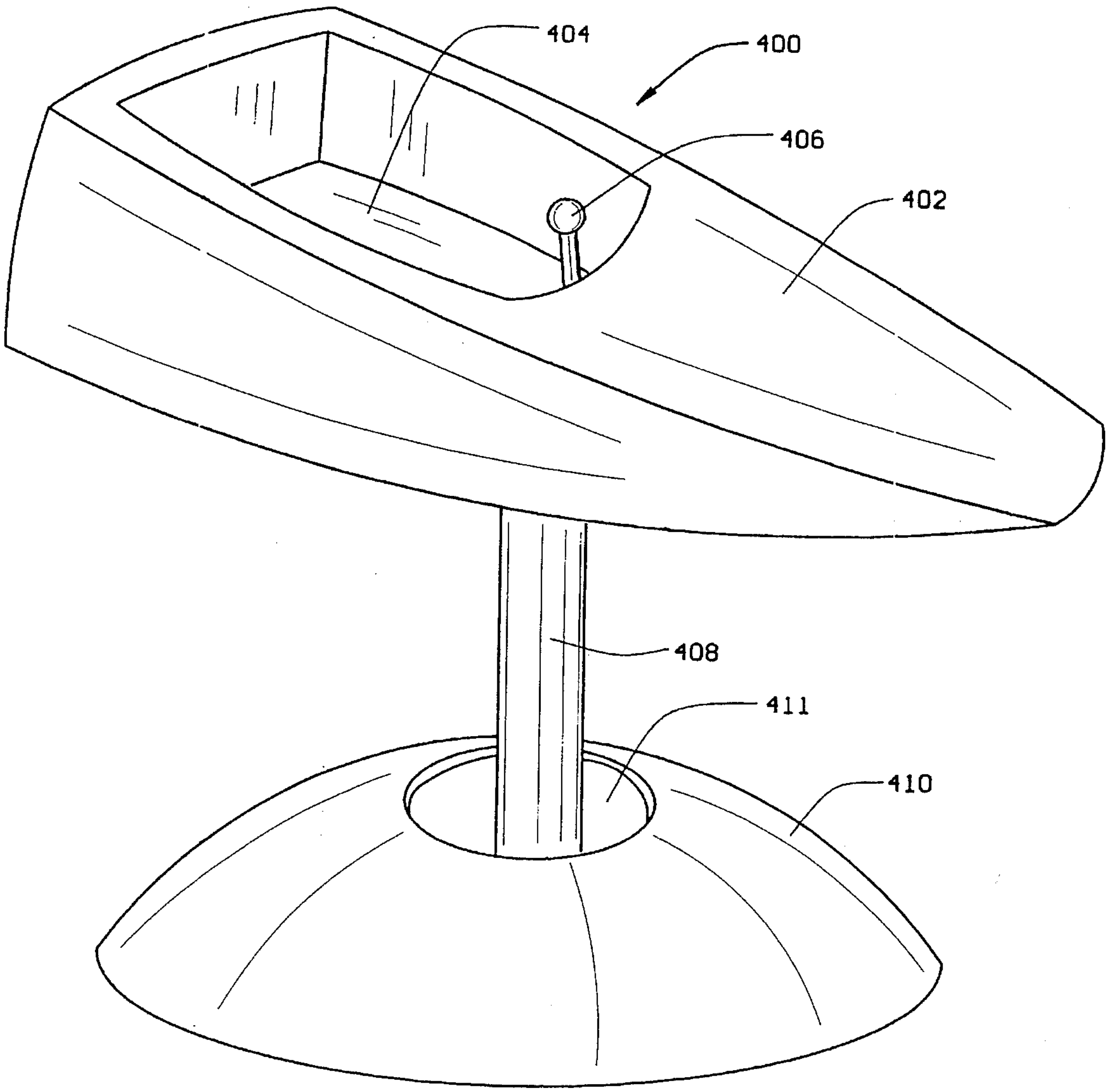
FIG. 13 is an isometric view of an object configured as an amusement ride in which the base support of the present invention is employed.

An amusement ride employing a base support made in accordance with the principles of the present invention is shown in FIG. 13, and indicated generally by reference numeral 400. Ride 400 has a car element 402. It will be appreciated that car 402 is shown in a rather generic form. Those skilled in the art will recognize that car 402 can be configured as a conventional automobile, space ship, boat, ATV, motorcycle or the like. Car 402 should have a seating area 404 to support the rider and a joystick 406 or other means for actuating the motors that drive the motor driven worms that will be described hereinafter. Furthermore, instead of a car, a platform or other means that would allow a user or a rider to stand upright can be used.

Car 402 is mounted or attached to an upper end of an upright support 408. The lower end of upright support 408 is appropriately attached to the base support of the present invention, which is shown in greater detail in FIGS. 14–17. The base support is covered by a dome 410 or other appropriate structure. Dome 410 has a central opening 411 that allows upright support 408 to extended out of the dome and allow unfettered movement of the upright. It will be appreciated that the dome 410 is shown for clarity of illustration and that any cover configuration that can house the base support and allow for movement of the upright support 408 is within the scope of the invention.

Turning now to a detailed description of the base support of the present invention shown in FIGS. 14–17, the base support is indicated generally by reference numeral 425. Support 425 is attached to a fixed mount 427. It will be appreciated that fixed mount 427 is secured to the floor, the ground, or to the bottom (not shown) of cover 410. It will be understood that fixed mount 427 must be stable and secure and of sufficient strength to support the whole of ride 400. An optional second fixed mount (not shown) can be added to impart greater stability to the ride and will be discussed below.

Figure 17:
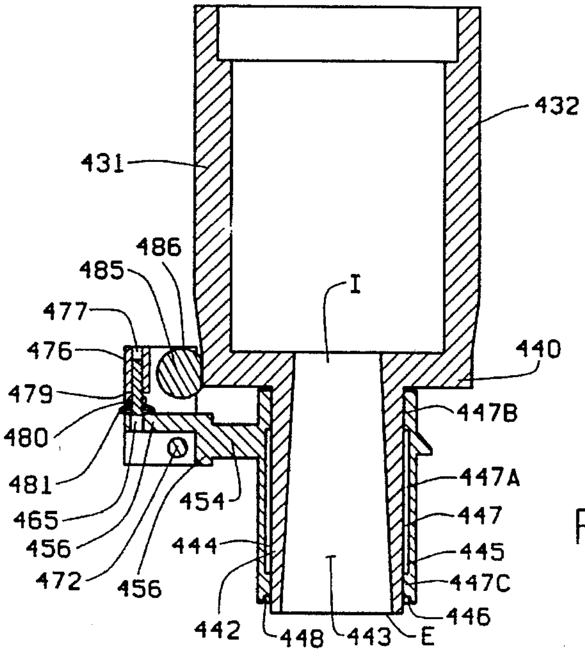
FIG. 17 is a cross-sectional view of the bearing assembly taken across line 17—17 of FIG. 16.

Support 425 has a first worm gear assembly 430 having diametrically opposed support legs 431 and 432. The support legs are attached to fixed mount 427 by a pair of nut and bolt assemblies 434, 436 which extends through each leg and the fixed mount. First worm gear assembly 430 includes a vertically disposed worm gear 440, having a plurality of gear teeth 441, integrally attached to the support legs, and an integrally attached inner tubular bearing 442 on the side opposite the support legs. As shown in FIG. 17, bearing 442 has an axial bore 443 formed therein. Bore 443 has an inner diameter that decreases from the outer end E to the inner end I. Bearing 442 has an outer bearing surface 444. Since legs 431 and 432 are attached to a fixed mount, inner tubular bearing 442 is fixed. An optional fixed mount can be attached at the end E of the inner tubular bearing to enhance rigidity and support.

There is an outer tubular bearing 445 around the inner tubular bearing 442. Outer tubular bearing 445 has an axial bore 447 (FIG. 17) formed therein. There is a rabbet 446 formed in the end of the outer tubular bearing. Bore 447 has a central inner diameter 447A, greater than the outer diameter of inner tubular bearing 442. However, the ends 447B and 447C of bore 447 are only slightly oversized relative to inner tubular bearing 442 so as to provide bearing surfaces between the inner and outer tubular bearings. Bearing surfaces 447 and 447c engage bearing surface 444. The reduced areas of bearing surface, i.e. 447B and 447C, allow for more precise machining of the bore and bearing surfaces when machining the length of bore 447 into a bearing surface. A delrin ring 448 is positioned in rabbet 446 between the inner and outer bearings to allow the outer tubular bearing to rotate smoothly about the inner tubular bearing and seal the arrangement. A snap ring 449 (FIG. 16) seals the assembly.

There is a first mounting boss 450 on an outer side of the outer tubular bearing and a second mounting boss 452 on the opposite outer side of the outer tubular bearing at 180° to the first mounting boss. Each of the mounting bosses has a pair of threaded holes (not shown) formed therein to accept conventional threaded bolts as will be explained below.

There is a fixed worm assembly mounting boss 454 on one side of the outer tubular bearing at approximately 90° relative to the previously described mounting bosses. Boss 454 has an extension 456 to accommodate the mounting of a motor driven worm assembly. Extension 456 has a substantially open-sided box configuration with a back wall 457 attached to boss 454, a top wall 458, a bottom wall 459 and one side wall 460. The various walls define a slot 462. There is a hole 465 formed in side wall 460. There are aligned bolt holes (not shown) formed in the top and bottom walls to accommodate the introduction of a mounting bolt as will now be explained.

An adjustable motor driven worm housing 470 is attached to the fixed boss 454 by a conventional nut and bolt assembly or pivot pin 472 that extends through the holes formed in top wall 458 and bottom wall 459. Housing 470 has a first wall 473 and an opposed second wall 474. There is a space 475 between the respective walls. A support wall 476 is positioned between the first and second walls. Support wall 476 has a threaded bore 477 (FIG. 17) formed therethrough, extending from edge to edge. There is a threaded screw 479 in threaded bore 477. Screw 479 has an adjustable nut 480. There can be one or more spring bevel washers 481 of known compression positioned around screw 479 between nut 480 and fixed boss 454. Nut 480 is spring pressure adjusted to increase or decrease tension on the worm as will be explained below. There is a substantially cylindrical motor mount 482 on second wall 474. There is an axial bore 483 within the motor mount. It will be appreciated that a conventional electric motor M (FIG. 15) is attached to the motor mount 482. Motor M is connected by an electrically conductive wire W to a controller, for example joystick 406 (FIG. 13) and to a source of electricity. The motor M has a housing also which contains a conventional gear train G.

A motor driven worm 485, having a continuous helical tooth 486, is positioned in housing 470. A first end (not shown) extends into the motor housing 482 and has appropriate means thereon to engage the motor M. The second end 487 is rotatable attached to wall 473 by appropriate means. Helical tooth 486 is in intermeshing arrangement with the gear teeth 441 of worm gear 440. The tension between worm 485 and worm gear 440 can be adjusted, as previously mentioned. Nut 480 can be rotated on screw 479 and urged against the spring bevel washers 481. The nut and washer are greater in diameter than hole 465. Therefore, nut 480 and washers 481 are urged against the fixed boss 454. The downward force exerted on the housing 470 causes the housing 470 to pivot about pin 472 thereby urging worm 485 against worm gear 440. The amount of tension can be varied by adjusting nut 480 or by adjusting, adding or changing the washers 481.

Support 425 has a second worm gear assembly 490 having diametrically opposed support legs 492 and 494. The support legs are attached to the mounting bosses 450 and 452 of the outer tubular bearing 445 by a pair conventional bolts 496 and 498 or other appropriate attachment means. Second worm gear assembly 490 includes a vertically disposed worm gear 500, having a plurality of gear teeth 501, integrally attached to the support legs and integrally attached to an inner tubular bearing 503 on the side opposite the support legs. The bearing 503 is constructed identical to inner tubular bearing 442, previously described.

Figure 14:
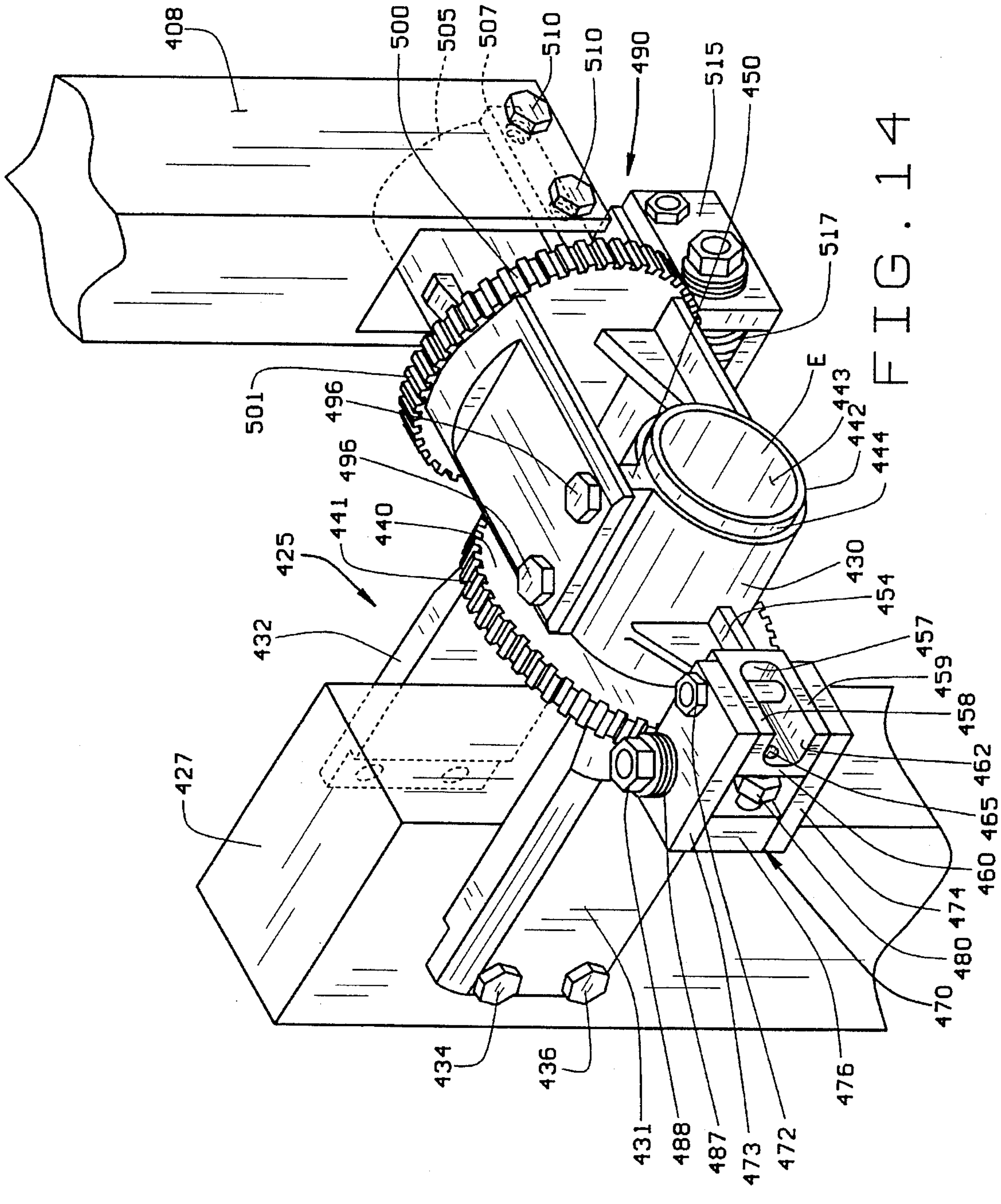
FIG. 14 is one perspective view of the base support of the present invention as employed in an amusement ride.
Figure 15:
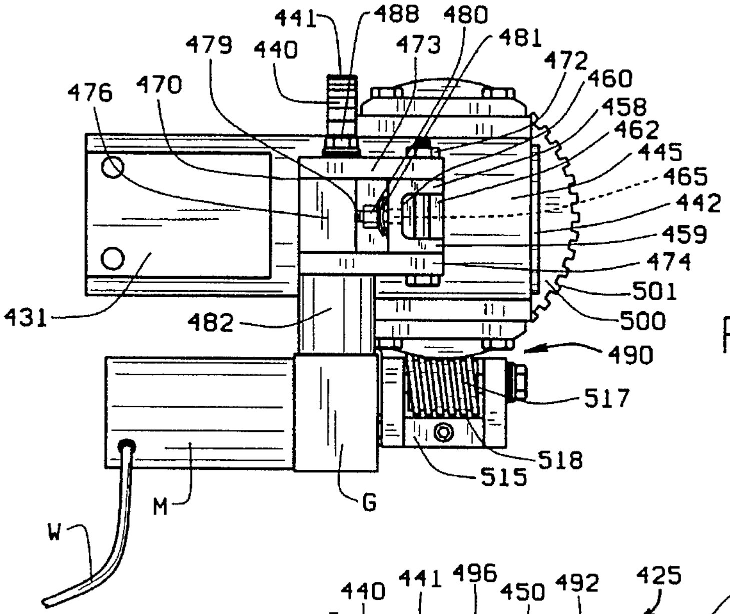
FIG. 15 is a side elevational view thereof.
Figure 16:
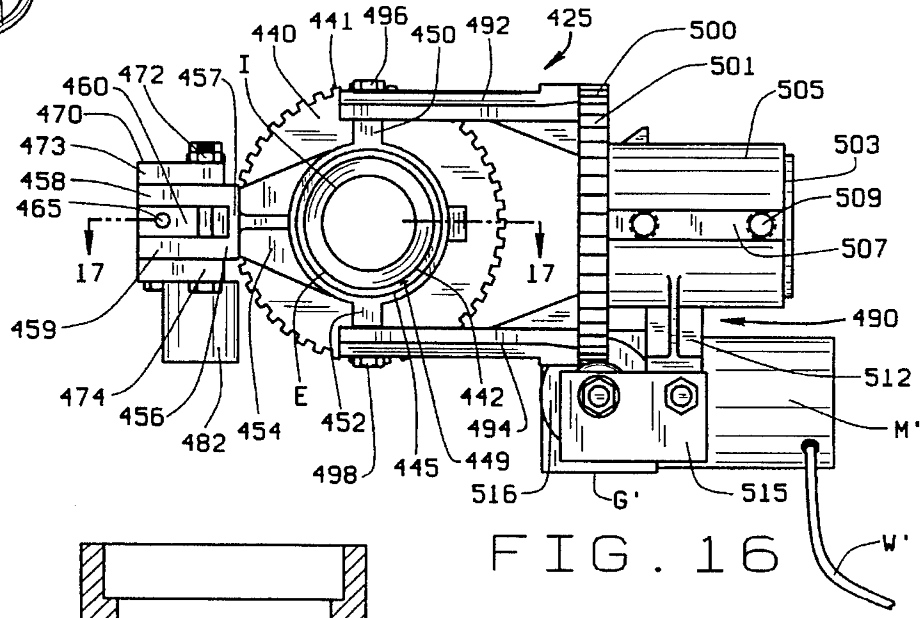
FIG. 16 is a side elevational view of the side opposite that shown in FIG. 15.

There is an outer tubular bearing 505 around the inner tubular bearing 503. Outer tubular bearing 505 is constructed identical to outer tubular bearing 445, previously described. There is a first mounting boss 507 on an outer side of the outer tubular bearing and a second mounting boss (not shown) on the opposite outer side at 180° to the first mounting boss. Each of the bosses has a pair of threaded holes 509. The upright support 408 is bolted to the outer tubular bearing at the bosses with bolts 510 (FIG. 14). There is a fixed motor driven worm mounting boss 512 on one side of the outer bearing at approximately 90° to the mounting boss 507. Boss 512 is identical to the previously described mounting boss 454. An adjustable motor driven worm housing 515 is attached to the fixed boss 512. Housing 515 is identical to the previously described housing 470 including a motor mount 516. There is a motor driven worm 517, having a continuous helical tooth 518, positioned in housing 515 and functions the same as the previously described motor driven worm worm 517 is driven by a second motor M' through gears G' attached to motor mount 516. Furthermore, the tension between worm 517 and worm gear 500 is adjusted in a manner identical to the way the tension between worm gear 440 and worm 485 is adjusted.

It will be appreciated that the activation of the two motor driven worms 485 and 517 by motors M will produce movement of the ride car 402 in two planes. As worm 485 rotates, the worm gear 485 as well as housing 470 moves about worm gear 440, which is stationary. Outer tubular bearing 445 rotates about the axis of inner bearing 442. This rotation moves the second worm gear assembly 490, as orientated in the drawings, left to right or vice versa. Also, as worm gear 517 rotates, the worm gear 500, as well as housing 515 and outer tubular bearing 505 rotate about the axis of inner tubular bearing 503 to move upright 408, as orientated in the drawings, front to back or vice versa. Activation of both worms, simultaneously, will create a substantially circular movement of the ride or across the top half of a sphere.

It will obvious to the those skilled in the art that various modifications and changes can be made in the antenna base supports previously described and illustrated without departing from the scope of the appended claims. For example, the terms "left to right" or "front to back" as used above are relative terms depending upon the orientation of the motor driven worm and worm gear assemblies. Therefore, the detailed description and accompanying illustrations are intended to be illustrated only, and should not be construed in a limiting sense.

I claim:

1. A base support for supporting, positioning and maintaining a desired position of an object, configured as an amusement ride mounted on a stationary upright comprising;

a first worm gear assembly, said first worm gear assembly having an outer tubular main bearing;

an inner tubular bearing within said outer tubular bearing, said inner tubular bearing having a worm gear at one end with a pair of opposed support legs extending therefrom for mounting said first worm gear assembly to the stationary upright;

a first motor driven worm assembly mounted on said outer tubular bearing, said first motor driven worm assembly including a worm and a motor for driving said worm, said worm being mounted in tight intermeshing contact with the worm gear of said first worm gear assembly, said motor, said first motor driven worm assembly, and said outer tubular bearing all being movable about the axis of said inner tubular bearing upon operation of said motor;

a second worm gear assembly having an outer tubular bearing, the last said outer tubular bearing having means thereon for attaching an amusement ride support means;

an inner tubular bearing within the last said outer tubular bearing having a worm gear at one end with a pair of opposed support legs extending therefrom for mounting said second worm gear assembly to the last said outer tubular bearing of said first worm gear assembly;

amusement ride support means attached to the last said outer tubular bearing; and a second motor driven worm assembly mounted on the last said outer tubular bearing, said second motor driven worm assembly including a worm and a motor for driving said worm, said worm being mounted in tight intermeshing contact with the worm gear of said second worm gear assembly;

the last said motor, said second motor driven worm assembly, the last said outer tubular bearing and said amusement ride support means all being movable about an axis of the last said inner tubular bearing upon operation of the last said motor.

2. The base support of claim 1 further comprising a second stationary upright on said inner tubular bearing at an end opposite said worm gear.

3. The base support of claim 1 wherein each said motor is driven by a motor driver.

4. The base support of claim 1 wherein each motor driven worm assembly has means thereon for adjusting a tension between each said motor driven worm and each said worm gear in intermeshing contact therewith.

5. The base support of claim 1 wherein each said outer tubular bearing has an axial bore, each said axial bore having a first bearing surface at a first end and a second bearing surface at a second end.

6. In combination with an amusement ride, a base support for supporting, positioning and maintaining a desired position of the amusement ride mounted on a stationary upright comprising:

first worm gear assembly having a first outer tubular bearing, said first outer tubular bearing having an axial bore with first and second inner tubular bearing surfaces formed at first and second ends thereof;

a first inner tubular bearing within said first outer tubular bearing, said first inner tubular bearing having an external bearing surface in contact with said first and second inner tubular bearing surfaces of said outer tubular bearing, said first inner tubular bearing having a first worm gear at one end with a pair of opposed support legs extending therefrom for mounting said first worm gear assembly to the stationary upright;

a first motor driven worm assembly mounted on said first outer tubular bearing, said first motor driven worm assembly including a first worm operatively connected to the first worm gear of said first worm gear assembly, said first motor driven worm assembly including a first motor for driving said first worm, said first worm being mounted in tight intermeshing contact with the first worm gear of said first worm gear assembly;

said first motor, said first motor driven worm assembly and said first outer tubular bearing all being movable about the axis of said first inner tubular bearing upon operation of said motor;

a second worm gear assembly, said second worm gear assembly having a second outer tubular bearing with an axial bore having first and second inner bearing surface at first and second ends, an amusement ride support attached to said second outer tubular bearing;

a second inner tubular bearing member within said second outer tubular bearing said second inner tubular bearing having an external bearing surface in contact with said first and second inner tubular bearing surfaces of said outer tubular bearing, said second tubular inner bearing having a second worm gear at one end with a pair of opposed support legs extending therefrom for mounting said second worm gear assembly on said first outer tubular bearing;

a second motor driven worm assembly mounted on said second outer tubular bearing, said second motor driven worm assembly including a second worm operatively connected to the second worm gear of said second worm gear assembly, said second motor driven worm assembly including a second motor for driving said second worm, said second worm being mounted in tight intermeshing contact with said second worm gear of said second worm gear assembly;

said second motor, said second motor driven worm assembly, said second tubular outer main bearing and said amusement ride support means all being movable about the axis of said second inner tubular bearing upon operation of said second motor.

7. The combination of claim 6 wherein each said motor driven worm assembly has means thereon for adjusting said tight intermeshing contact between each said worm and each said worm gear.

* * * * *